United States Patent [19]
Alimpich et al.

[11] Patent Number: 6,104,395
[45] Date of Patent: *Aug. 15, 2000

[54] GRAPHICAL INTERFACE METHOD, APPARATUS AND APPLICATION FOR OPENING WINDOW OF ALL DESIGNATED CONTAINER OBJECTS

[75] Inventors: Claudia C. Alimpich; Joan Stagaman Goddard, both of Boulder, Colo.; Minh Trong Vo, Mountain View, Calif.; James Philip Wittig, Boulder; Rachel Youngran Yang, Superior, both of Colo.

[73] Assignee: International Business Machines Corporation, Armonk, N.Y.

[ * ] Notice: This patent issued on a continued prosecution application filed under 37 CFR 1.53(d), and is subject to the twenty year patent term provisions of 35 U.S.C. 154(a)(2).

[21] Appl. No.: 08/696,749

[22] Filed: Aug. 14, 1996

[51] Int. Cl.[7] ........................................ G06F 3/00
[52] U.S. Cl. ........................ 345/340; 345/346; 345/356
[58] Field of Search .................................. 345/340, 343, 345/348, 346, 356, 342, 345

[56] References Cited

U.S. PATENT DOCUMENTS

| | | | |
|---|---|---|---|
| 4,464,652 | 8/1984 | Lapson et al. | 340/710 |
| 5,001,654 | 3/1991 | Winiger et al. | 364/523 |
| 5,062,060 | 10/1991 | Kolnick | 364/521 |
| 5,065,347 | 11/1991 | Pajak et al. | 345/348 |
| 5,072,412 | 12/1991 | Henderson | 395/159 |
| 5,095,512 | 3/1992 | Roberts et al. | 382/56 |
| 5,117,372 | 5/1992 | Petty | 395/161 |

(List continued on next page.)

FOREIGN PATENT DOCUMENTS

| | | |
|---|---|---|
| 2097540 | 12/1994 | Canada . |
| 0 587 394 A1 | 3/1994 | European Pat. Off. . |
| 0 622 728 A1 | 11/1994 | European Pat. Off. . |
| 4-361373 | 12/1992 | Japan . |
| 5-313845 | 11/1993 | Japan . |
| 6-4117 | 1/1994 | Japan . |
| 6-215095 | 8/1994 | Japan . |
| 7-129597 | 5/1995 | Japan . |

OTHER PUBLICATIONS

"Device Independent Graphics Using Dynamic Generic Operator Selection," *IBM Technical Disclosure Bulletin*, Apr. 1983, vol. 25, No. 11A, pp. 5477–5480.

"Error–Tolerant Dynamic Allocation of Command Processing Work Space," *IBM Technical Disclosure Bulletin*, Jun. 1984, vol. 27, No. 1B, pp. 584–586.

"Means for Computing the Max of a Set of Variables Distributed Across Many Processors," *IBM Technical Disclosure Bulletin*, Sep. 1990, vol. 33, No. 4, pp. 8–12.

"Graphical User Interface for the Distributed System Namespace," *IBM Technical Disclosure Bulletin*, Jul. 1992, vol. 35, No. 2, pp. 335–336.

"Graphical Query System," *IBM Technical Disclosure Bulletin*, Nov. 1993, vol. 36, No. 11, pp. 615–616.

"Configuration Data Set Build Batch Program," *IBM Technical Disclosure Bulletin*, Nov. 1993, vol. 36, No. 11, p. 571.

(List continued on next page.)

*Primary Examiner*—Raymond J. Bayerl
*Assistant Examiner*—Cao H. Nguyen
*Attorney, Agent, or Firm*—David W. Victor; Konrad Raynes & Victor LLP

[57] ABSTRACT

The invention is carried out in the following environment. The computer system has at least a visual operator interface, an operating system for operating applications within the computer system, and memory for storing at least part, preferably all, of an application. The present invention is of an application, apparatus, and method for selecting multiple container objects whose contents are to be viewed, and displaying in one window the contents of all of the selected container objects, as opposed to displaying one window for objects associated with each selected container object.

27 Claims, 5 Drawing Sheets

U.S. PATENT DOCUMENTS

| | | | |
|---|---|---|---|
| 5,119,476 | 6/1992 | Texier | 395/157 |
| 5,121,477 | 6/1992 | Koopmans et al. | 395/156 |
| 5,140,677 | 8/1992 | Fleming et al. | 395/159 |
| 5,140,678 | 8/1992 | Torres | 395/159 |
| 5,164,911 | 11/1992 | Juran et al. | 364/578 |
| 5,206,950 | 4/1993 | Geary et al. | 395/600 |
| 5,208,907 | 5/1993 | Shelton et al. | 395/149 |
| 5,226,117 | 7/1993 | Miklos | 345/356 |
| 5,228,123 | 7/1993 | Heckel | 395/155 |
| 5,233,687 | 8/1993 | Henderson et al. | 395/158 |
| 5,247,651 | 9/1993 | Clarisse et al. | 395/500 |
| 5,249,265 | 9/1993 | Liang | 395/160 |
| 5,255,359 | 10/1993 | Ebbers et al. | 395/161 |
| 5,276,901 | 1/1994 | Howell et al. | 395/800 |
| 5,287,447 | 2/1994 | Miller et al. | 395/157 |
| 5,307,451 | 4/1994 | Clark | 395/127 |
| 5,315,703 | 5/1994 | Matheny et al. | 395/164 |
| 5,317,687 | 5/1994 | Torres | 395/159 |
| 5,317,730 | 5/1994 | Moore et al. | 395/600 |
| 5,367,619 | 11/1994 | Dipaolo et al. | 395/149 |
| 5,371,844 | 12/1994 | Andrew et al. | 395/155 |
| 5,377,317 | 12/1994 | Bates et al. | 395/157 |
| 5,388,255 | 2/1995 | Pytlik et al. | 395/600 |
| 5,394,521 | 2/1995 | Henderson et al. | 395/158 |
| 5,404,439 | 4/1995 | Moran et al. | 395/155 |
| 5,410,695 | 4/1995 | Frey et al. | 395/650 |
| 5,410,704 | 4/1995 | Norden-Paul et al. | 395/700 |
| 5,412,776 | 5/1995 | Bloomfield et al. | 395/160 |
| 5,414,806 | 5/1995 | Richards | 395/135 |
| 5,416,900 | 5/1995 | Blanchard et al. | 395/155 |
| 5,418,950 | 5/1995 | Li et al. | 395/600 |
| 5,428,554 | 6/1995 | Laskoski | 364/550 |
| 5,428,776 | 6/1995 | Rothfield | 395/600 |
| 5,438,659 | 8/1995 | Notess et al. | 395/155 |
| 5,450,545 | 9/1995 | Martin et al. | 395/700 |
| 5,454,071 | 9/1995 | Siverbrook et al. | 395/141 |
| 5,454,106 | 9/1995 | Burns et al. | 395/600 |
| 5,459,825 | 10/1995 | Anderson et al. | 395/133 |
| 5,459,832 | 10/1995 | Wolf et al. | 395/155 |
| 5,463,724 | 10/1995 | Anderson et al. | 395/148 |
| 5,463,726 | 10/1995 | Price | 345/345 |
| 5,473,745 | 12/1995 | Berry et al. | 395/157 |
| 5,479,599 | 12/1995 | Rockwell et al. | 395/155 |
| 5,481,666 | 1/1996 | Nguyen et al. | 395/159 |
| 5,483,651 | 1/1996 | Adams et al. | 395/600 |
| 5,487,141 | 1/1996 | Cain et al. | 395/135 |
| 5,491,795 | 2/1996 | Beaudet et al. | 395/159 |
| 5,497,454 | 3/1996 | Bates et al. | 395/158 |
| 5,497,484 | 3/1996 | Potter et al. | 395/600 |
| 5,544,300 | 8/1996 | Skarbo et al. | 345/332 |
| 5,619,638 | 4/1997 | Duggan et al. | 345/340 |
| 5,694,561 | 12/1997 | Malamud et al. | 345/346 |

OTHER PUBLICATIONS

Self–Contained Reusable Programmed Components, *IBM Technical Disclosure Bulletin*, Jul. 1995, vol. 38, No. 7, pp. 283–285.

"IBM Printing Systems Manager for AIX Ovierview," *International Business Machines Corporation*, Second Edition, Feb. 1996.

"IBM Printing Systems Manager for AIX Administrating," *International Business Machines Corporation*, 1995.

"Matching Three–Dimensional Objects Using a Relational Paradigm," *Pattern Recognition*, vol. 17, No. 4, pp. 385–405, 1984.

"A Multicolumn List–Box Container for OS/2," *Dr. Dobb's Journal*, May 1994, vol. 19, No. 5, pp. 90–94.

GRAPHICAL INTERFACE METHOD, APPARATUS AND APPLICATION FOR OPENING WINDOW OF ALL DESIGNATED CONTAINER OBJECTS

BACKGROUND OF THE INVENTION AND STATE OF THE PRIOR ART

1. Field of the Invention

The present invention relates to graphical user interfaces. More particularly, the invention relates to a method, apparatus and application for opening a single window showing the contents for all designated container objects.

2. Description of Related Art

In order to better understand the terms utilized in this patent application, a brief background definition section will be presented so that the reader will have a common understanding of the terms employed and associated with the present invention.

A "user interface" is a group of techniques and mechanisms that a person employs to interact with an object presented in a window. The user interface is developed to fit the needs or requirements of the users who use the object. Commonly known user interfaces can include telephone push buttons or dials, or pushbuttons such as on a VCR or a television set remote. With a computer, many interfaces not only allow the user to communicate with the computer but also allow the computer to communicate with the user. These would include (1) commandline user interfaces (i.e., user remembered commands which he/she enters, e.g. "C:>DIR" in which "DIR" is a typical DOS command entered at the "C" prompt); (2) menu-driven user interfaces which present an organized set of choices for the user, and (3) graphical user interfaces, ("GUI") in which the user points to and interacts with elements of the interface that are visible, for example by a "mouse" controlled arrow or cursor.

An example of a GUI user interface is that which is offered by International Business Machines Corporation (IBM) under the name "Common User Access" ("CUA"). This GUI incorporates elements of object orientation (i.e., the user's focus is on objects and the concept of applications is hidden). Object orientation of the interfaces allow for an interconnection of the working environment in which each element, called an "object," can interact with every other object. The objects users require to perform their tasks and the objects used by the operating environment can work cooperatively in one seamless interface. With objected oriented programming using a GUI, the boundaries that distinguish applications from operating systems are no longer apparent or relevant to the user.

In connection with this patent application, an "object" means any visual component of a user interface that a user can work with as a unit, independent of other items, to perform a task. By way of example, a spreadsheet, one cell in a spreadsheet, a bar chart, one bar in a bar chart, a report, a paragraph in a report, a database, one record in a database, and a printer are all objects. Each object can be represented by one or more graphic images, called "icons," with which a user interacts, much as a user interacts with objects in the real world. (NOTE: In the real world, an object might be an item that a person requires to perform work. As an example, an architect's objects might include a scale, T-square, a sharp pencil, while an accountant's objects might include a ledger and a calculator.) However, it is not required that an object always be represented by an icon, and not all interaction is accomplished by way of icons. For example, and as will be seen hereinafter, a user can interact with an object by opening a window that displays more information about the object and includes a variety of mechanisms for interacting with the object.

While classification of objects may follow many different definitions, each class of objects has a primary purpose that separates it from the other classes. A class may be looked at as a group of objects that have similar behavior and information structures. In addition, each of the objects enumerated and defined below may contain other objects. There are three primary classes of objects. Each is discussed below.

(1) Container Object: This object holds other objects. Its principal purpose is to provide the user with a way to hold or group related objects for easy access or retrieval. An operating system, e.g. OS/2200 (a trademark of IBM Corporation) or Windows® (a trademark of Microsoft Corporation), typically provides a general-purpose container, for example a folder or a program group—that holds any type of object, including other containers. For example, imagine a program group (or folder) labeled "PRIVATE FOLDER—ICONS". In the program group are three folder icons labeled "REPORTS", "PORTFOLIO" and "LETTERS". By selecting with a mouse or other pointing device the icon "PORTFOLIO", another window may open showing three more icons labeled "OIL PAINTINGS", "WATERCOLORS", and "PORTRAITS," respectively. In turn, selecting any of those three icons may open additional windows with further icons representing further subdivisions, or cross-references (e.g., "CUSTOMERS")).

(2) Data objects: The principal purpose of a data object is to convey information. This information may be textual or graphical information or even audio or video information. For example, a business report displayed on the computer monitor may contain textual information concerning sales of "gadgets" over the past few years (text object) to all customers and also may contain a bar chart (graphic object) to pictorially depict, on the same monitor screen, the sales information.

(3) Device Objects: The principal purpose of a device object is to provide a communication vehicle between the computer and another physical or logical object. Many times the device object represents a physical object in the real world. For example, a mouse object or icon can represent the user's pointing device, and a modem object can represent the user's modem, or a printer object or icon can represent the user's printer. Other device objects are purely logical, e.g. an out-basket icon representing outgoing electronic mail; a wastebasket object or icon representing a way the user may "trash" or dispose of other objects.

As can be seen from the foregoing, a class of objects may be defined as a description of the common characteristics of several objects, or a template or model which represents how the objects contained in the class are structured. While there are further ways in which to define objects and class of objects, typically each class of objects will include similar attributes, the values of which the user will alter, modify, replace or remove from time to time. (For a more complete discussion of objects, attributes, object oriented interfaces etc., see "Object Oriented Interface Design: IBM Common User Access" (published by Que, ISBN 1-56529-170-0).

Suppose the user desires to see the contents of several container objects. The container objects may or may not be shown in the same window. Current graphical interface architectures do not provide a mechanism to facilitate viewing the contents of several container objects simultaneously, particularly where the container objects are in different windows. Typically, the application will open multiple windows when the user wants to see the contents of multiple container objects. This frequently is inconvenient and cumbersome for the user.

SUMMARY OF THE INVENTION

In view of the above, it is a principal object of the present invention to provide a graphically oriented method, application and apparatus to facilitate viewing the contents of multiple container objects.

Yet another object of the present invention is to permit the user to conveniently view the contents of multiple container objects.

Still another object of the present invention is to provide an application which may be employed in a number of different computers, may be transported between different computers, and may be loaded into various computer environments.

The invention is carried out in the following environment. The computer system has at least a visual operator interface, an operating system for operating applications within the computer system, and memory for storing at least part, preferably all, of an application. The present invention is of an application, apparatus, and method for selecting multiple container objects whose contents are to be viewed, and displaying in one window the contents of all of the selected container objects.

Other objects of the invention and a more complete understanding of the invention may be had by referring to the following description taken in conjunction with the accompanying drawings.

BRIEF DESCRIPTION OF THE DRAWING(S)

DESCRIPTION OF THE ILLUSTRATIVE EMBODIMENT(S)

Figure 1:
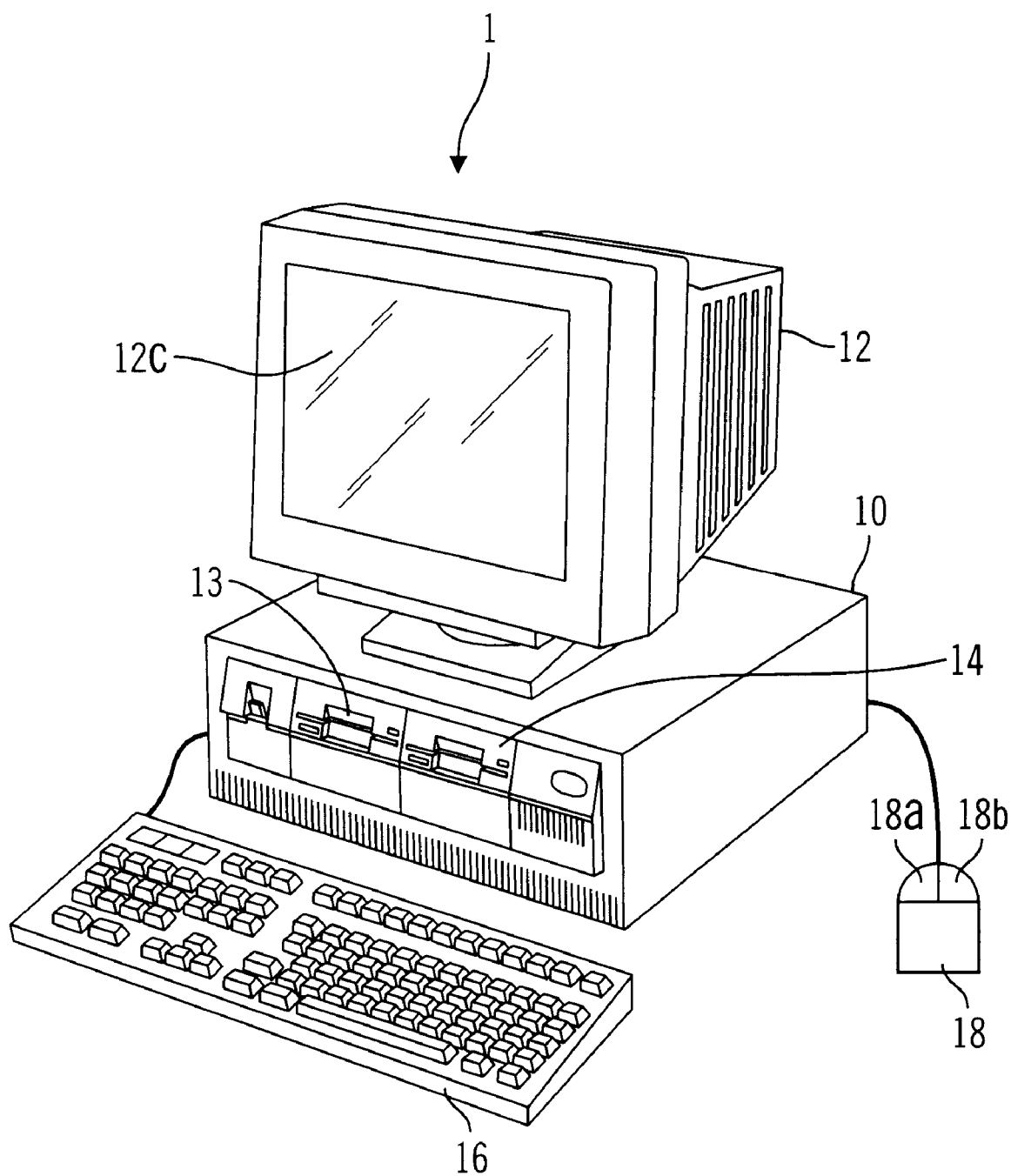
FIG. 1 illustrates a typical desktop computer system which may be employed to practice the novel method and application of the present invention.
Figure 2:
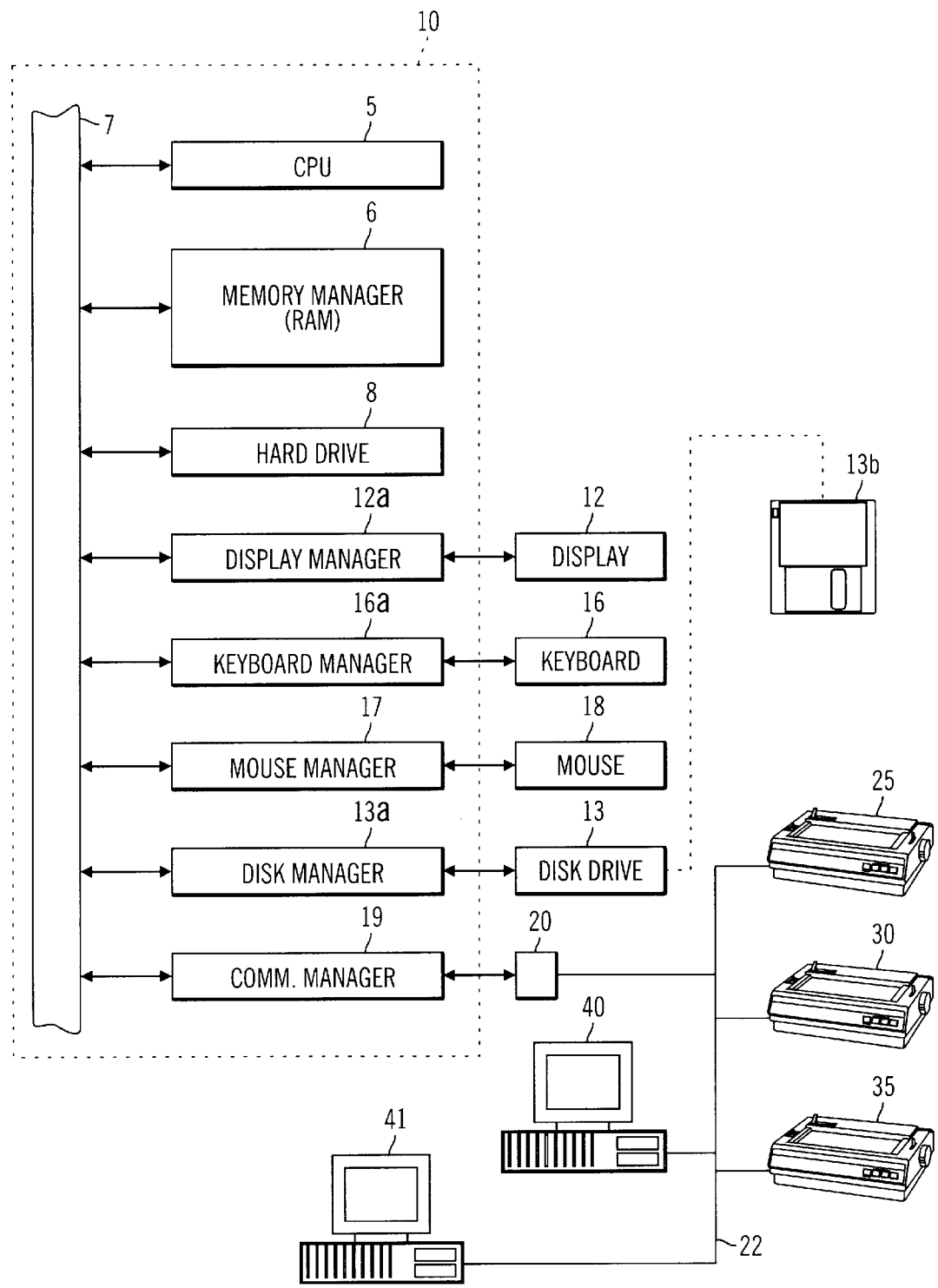
FIG. 2 is a block diagram illustrating a sample configuration of the computer system shown in FIG. 1.

Turning now to the drawings, and especially FIGS. 1 and 2, FIG. 1 diagrammatically shows a computer system 1 which may be connected to a Local Area Network system (LAN 20) as shown in FIG. 2. As will become more evident from the following discussion, these systems may be employed for globally changing attribute values of selected objects in accordance with the present invention.

As shown in FIG. 1, the computer system 1 comprises a main chassis 10, a display means or monitor 12, a connected keyboard 16 and a pointing device, in the present instance a mouse 18 which is operator controlled to move a pointer cursor 12b (shown in FIG. 3) on the display or monitor screen 12c. As shown in FIG. 2, the chassis 10 includes a central processing unit, or "CPU" 5, a memory manager and associated random access memory, or "RAM" 6, a fixed disk or hard drive 8 (which may include its associated disk controller), a display manager 12a which is connected externally to the chassis 10 of the display 12; a keyboard manager 16a, which through flexible cable (not shown) is connected to the keyboard 16; a mouse manager 17 (which in some instances may form part of the display manager 12a, and may be in the form of a software driver) for reading the motion of the mouse 18 and its control mouse buttons (MB) 18a and 18b, shown in FIG. 1. A disk manager or controller 13a which controls the action of the disk drive 13 (and an optional drive such as a magneto-optical or CD ROM drive 14) shown in FIG. 1, rounds out most of the major elements of the computer system 1.

The pointer element or cursor 12b can be moved over the display screen 12c by movement of the mouse 18. The mouse buttons (MB) 18a and 18b give commands to the operating system, usually through a software mouse driver provided by the mouse manufacturer. With the first mouse button (MB) 18a the operator can select an element indicated on the display screen 12c using the pointer or cursor 12b, i.e., signify that an action subsequently to be performed is to be carried out on the data represented by the indicated element on the display screen 12c. The system normally gives some visual feedback to the operator to indicate the element selected, such as a change in color, or a blocking of the icon. The second mouse button (MB) 18b may be a menu button, if desired. Conventionally, when the operator presses button 18b, a selection menu or dialog with system commands will appear on the display screen 12c. The operator may select an icon or item from the selection menu or input information into the dialog box as appropriate using the cursor 12b and the first mouse button (MB) 18a. Some menu items, if selected, may call up another menu or submenu for the operator to continue the selection process.

The use of a mouse and selection menus is well known in the art, for example U.S. Pat. No. 4,464,652 to Lapson et al. describes a selection menu of the pull-down type in combination with a mouse. It should be recognized, of course, that other cursor pointing devices may be employed, for example a joystick, ball and socket, or cursor keys on the keyboard.

The foregoing devices (and software drivers therefore) within the chassis 10 communicate with one another via a bus 7. To round out the computer system 1, an operating system (not shown) must be employed. If the computer system is a typical IBM-based system, the operating system may be DOS-based and include a GUI interface such as contained in OS/2®, or WINDOWS®, or other operating system of choice. If the computer system is based upon RISC (reduced instruction set computer) architecture, then the operating system employed may be, in the instance of an IBM-based RISC architectured System/6000®, AIX. Alternatively, if the computer system 1 is a large host computer, such as a an IBM 3090, it may be running an operating system such as MVS or VM. This operating system normally includes a print service facility called PSF, which is a system-wide resource manager, which takes a "job" which has been formatted for a particular printer, and sends certain files, such as fonts, special commands and the like to the printer before sending the file to be printed.

By way of background only, if in the illustrated instance the computer system 1 is a RISC system, such as the IBM RISC/6000® computer system, it may be programmed to send a Page Description Language (PDL) called IPDS (Intelligent Print Data Stream) to a printer. However, other page description languages such as "PostScript" or "PCL" are equally applicable. Such page description languages as "PostScript" or "PCL" are normally, but not always, associated with low-end computer systems, and the present invention is equally applicable to those languages. The PDL sets the format of the page to be printed (i.e., start at 1" down and 1" to the right of the upper left corner of the page) and sends it to a rasterizer which takes the description, interprets it, error checks it and builds a pagemap which is logically composed of a two-dimensional array of bits, sometimes referred to as a bitmap. The pagemap is then rearranged and the words are transformed to a page in row major order. The words are then sent to the printer, and as is conventional, the printer printhead receives the words sent to it in a manner that allows it to print across the paper.

In the illustrated instance, the computer system 1 includes an I/O (Input/Output) manager or communications manager 19 (shown in FIG. 2) which serves to link the computer system for communications with the outside world such as to a systems printer, a modem or a LAN controller (such as a Token ring or ETHERNET or even through a modem employing SDLC) such as shown at 20 in FIG. 2. The LAN controller may be incorporated inside the computer system 1 or located externally as shown diagrammatically in FIG. 2, as desired. The LAN controller 20 may connect to other computer systems 40 and 41 as well as to other printers such as printers 25, 30 and 35 by communications cable 22 and the like.

Assume that the operator or system user decides to view the contents of multiple selected container objects. If a separate window appears for each container object, the resulting multitude of windows will be confusing and cumbersome for the user to work with and the windows are likely to overlap, thereby obstructing the user's view of the contents of one or more of the container objects.

Figure 3:
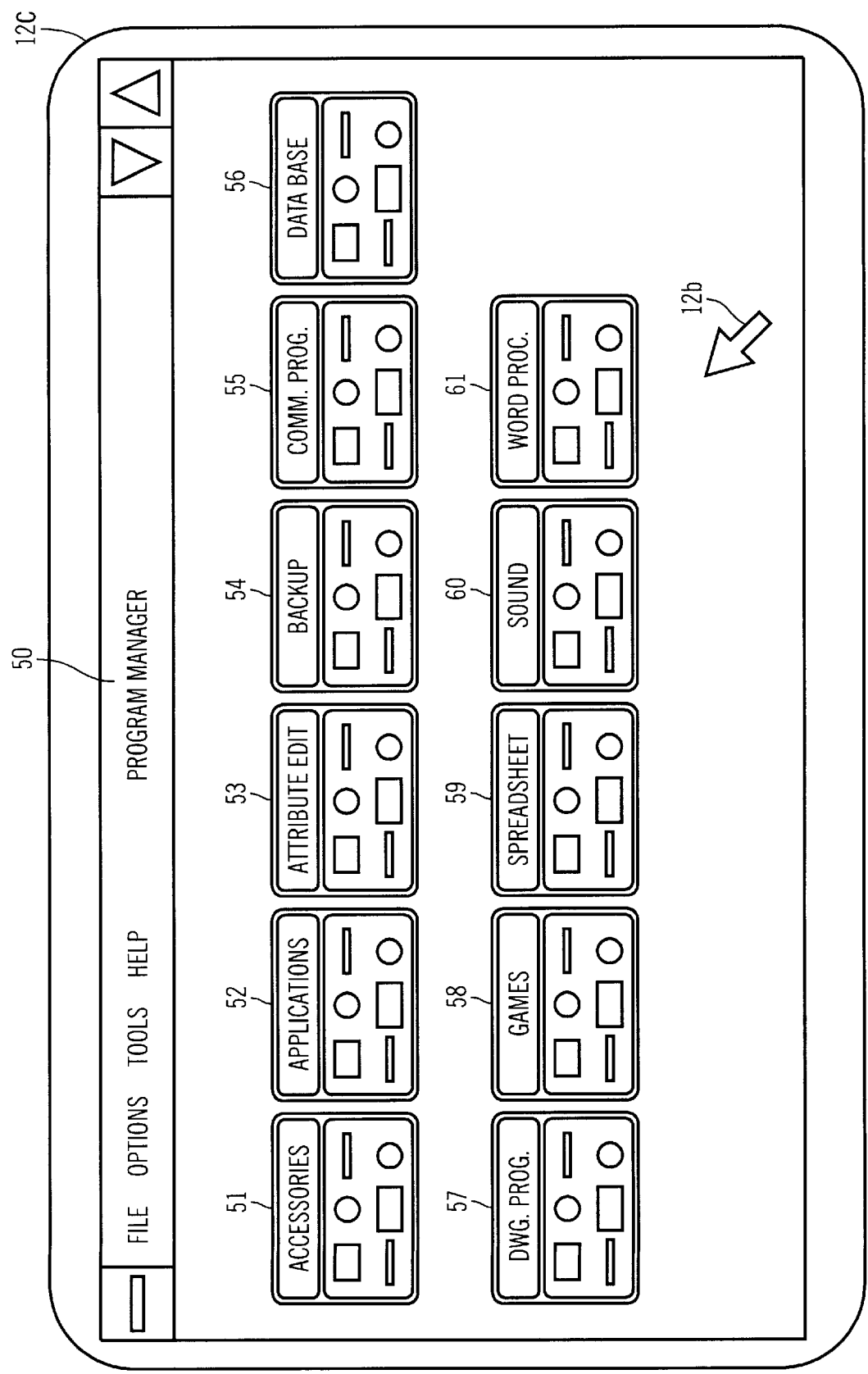
FIG. 3 is a typical screen display showing initial graphically oriented program groups arranged on the display, and illustrating the means for activation of the "Database" and the "Spreadsheet" objects.

Referring now to FIG. 3, the display screen 12c of the monitor 12 is shown with a program manager dialog 50 thereon which is similar to the conventional GUI interfaces employed, for example, with the operating systems currently widely used, such as, WINDOWS® or OS/2®. As illustrated, a plurality of example program groups 51–61 are shown therein. As is conventional, when the user desires to open one or more program groups, the mouse 18 is moved until the pointer 12b is in contact with the desired program group. Depending upon the operating system, simply depressing the left mouse button 18b may act to select and open the program group. In other operating systems, rapidly depressing the left mouse button twice selects and opens the program group. In either instance, opening the program group displays icons therein representative of certain programs which have been collected within the particular program group. Throughout this discussion, however, assume that depressing the mouse button 18a effects the desired action, regardless of whether it takes one or two depressions. Moreover, iconic representations of the same program or data may appear in more than one program group, or may be associated with more than one program within more than one group. For example, a particular printer may appear associated with programs in the Database program group 56, Word Processor program group 61 and Spread Sheet program group 59. Assume the user wants to view the contents of the Database object program group 56 and the Spreadsheet object program group 59. The user, therefore, selects both objects.

Figure 3A:
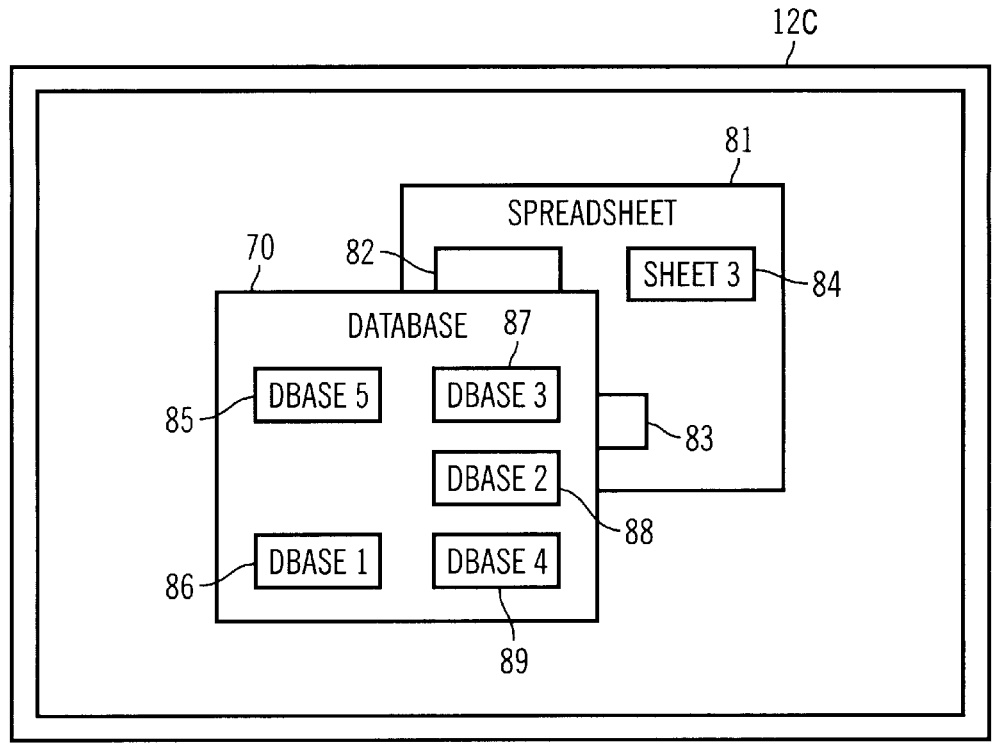
FIG. 3A illustrates the conventional display of a separate window to show the contents of each of the "Database" object as well as the "Spreadsheet" object.

Referring now to FIG. 3A, the display screen 12c of the monitor 12 displays the labeled Database dialog window 70.

FIG. 3A also shows the Spreadsheet dialog window 81. FIG. 3A demonstrates the problems with the conventional process by which a separate window is opened for each selected container object. As can be seen, the window 81 is largely hidden under window 70. The user will have difficulty viewing and working with window 81. As illustrated, and by way of example only, the Database dialog window 70 shows a plurality of icons 85–89 respectively, which represent various database application programs.

The Spreadsheet window 81 has three objects 82–84, each representing a spreadsheet application program. Objects 82 and 83 are partially hidden by window 70. Moreover, the user will have difficulty performing operations on objects in window 81, since it is largely hidden from view.

Figure 3B:
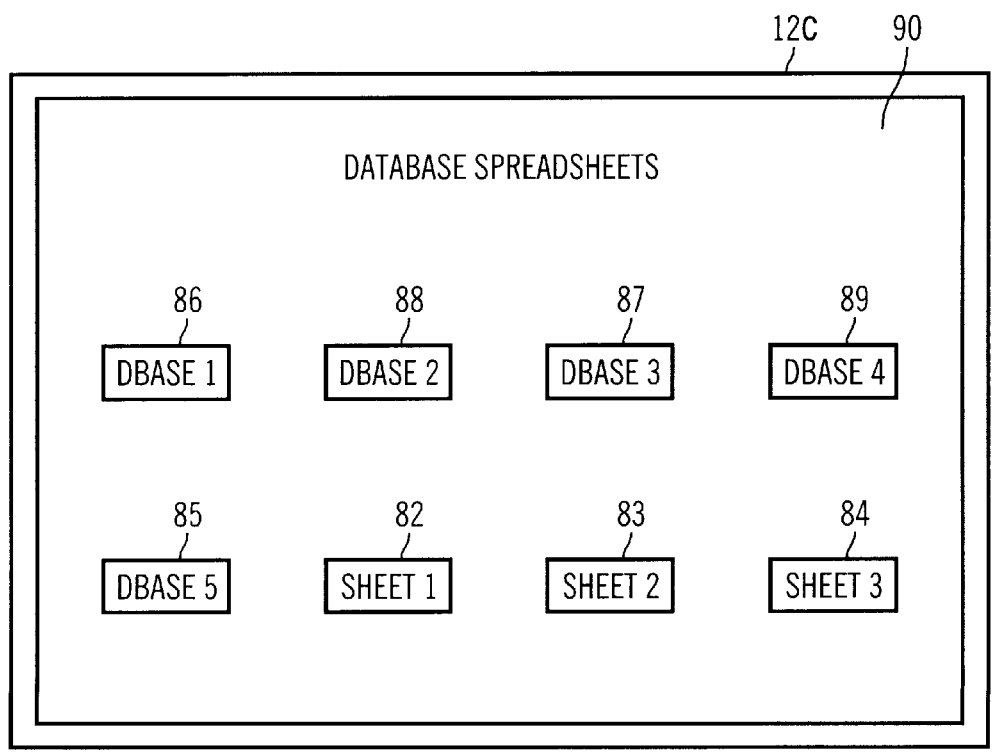
FIG. 3B is a typical screen display illustrating the method of the present invention of displaying in one window the contents of multiple selected container objects.

FIG. 3B shows the preferred application of the present invention. In FIG. 3B only one window 90 is generated. The window 90 contains objects 82–89. Objects 82–84 are from the Database object program group 56. Objects 85–89 are from the Spreadsheet object program group 59 The user can see easily all of the contents of both objects. The display of the contents in one window 90 results in a convenient mechanism for the user to see and perform operations on any one or more of the objects 82–89 contained within container objects 56 and 59.

Since all of the objects associated with the Database object program group 56 and the Spreadsheet object program group 59 are presented in one window, the user can act on all of the objects easily. For example, if the user wanted to print, this can be easily done even as to objects related to different parent objects.

If there is not enough space to display all of the objects associated with the selected objects, scroll bars appear, and the user then can scroll up or down through the window containing all of the objects associated with the selected objects.

Figure 4:
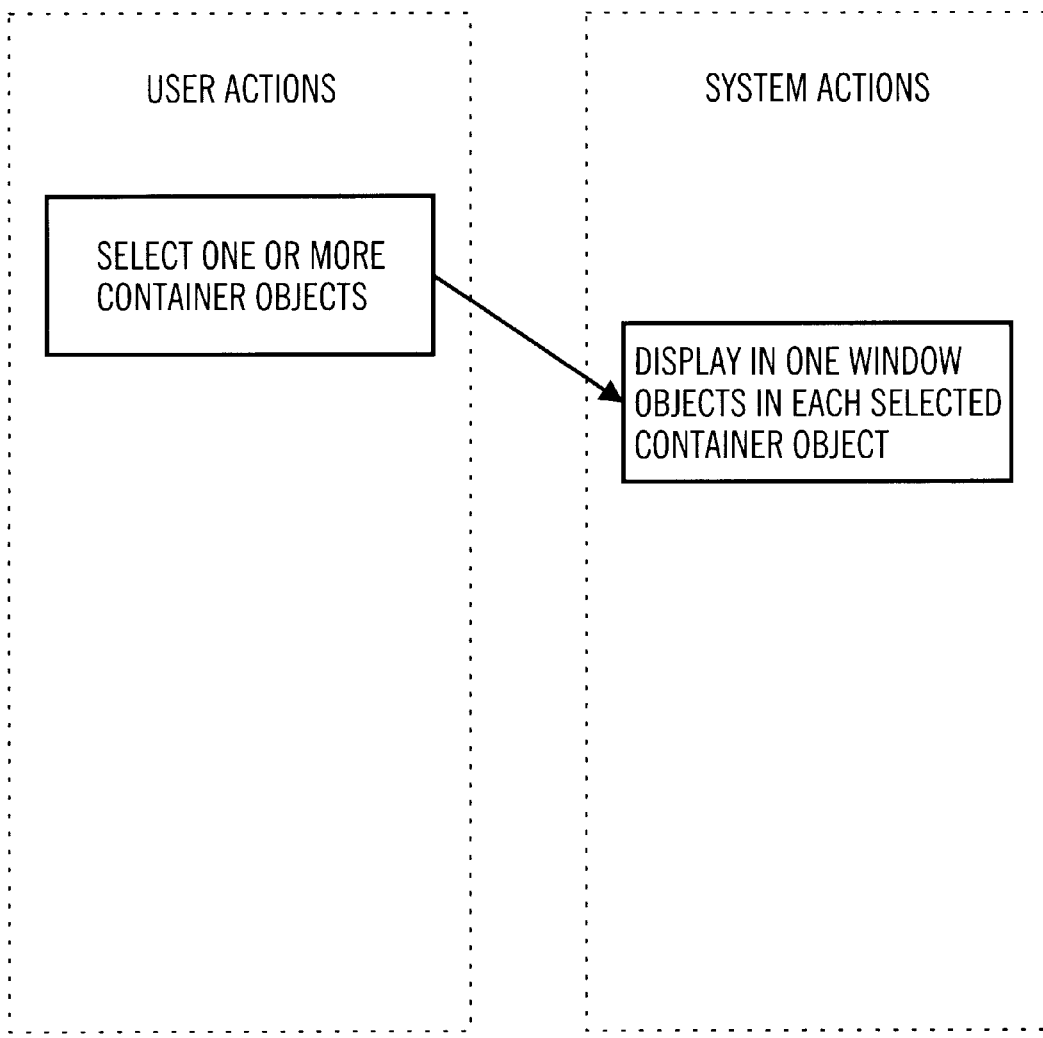
FIG. 4 is a logic diagram flow chart illustrating the method of the present invention.

FIG. 4 is a flowchart showing the method of the present invention.

Although the invention has been described with a certain degree of particularity, it should be recognized that elements thereof may be altered by persons skilled in the art with out departing from the spirit and scope of the invention. The invention is limited only by the following claims and their equivalents.

What is claimed is:

1. A computer system for displaying in one window contents of multiple selected container objects comprising:
   a display device;
   storage areas storing device objects and data objects accessible to the computer system;
   a visual operator interface, comprising:
      (i) means for defining a container object by selectively grouping, with the visual operator interface means, at least one object that is a member of the set of user selectable objects comprising device objects and data objects stored in any storage area accessible to the computer system; and
      (ii) means for selecting container objects; and
   means for displaying in a single window displayed on the display device the objects grouped by all of the selected container objects, wherein no two of the displayed objects are displayed in separate sub-windows within the single window displaying all of the objects, and wherein at least two objects from the first and second container objects are capable of being selected and operated upon at the same time while displayed in the single window.

2. The computer system of claim 1, wherein the visual operator interface further comprises means for performing operations on at least one of the objects grouped by the selected container objects.

3. The computer system of claim 1, wherein the visual operator interface further comprises means for performing operations on all of the objects grouped by the selected container objects.

4. The computer system of claim 1, wherein the visual operator interface further comprises means for scrolling contents of the single window to display all the objects grouped by the selected container objects.

5. The computer system of claim 1, wherein the visual operator interface further comprises means for including a device object in more than one container object.

6. The computer system of claim 1, wherein there are at least three container objects, wherein the means for selecting container objects further comprises means for selecting two of the at least three container objects.

7. The computer system of claim 1, wherein the means for displaying the objects grouped by the selected container objects further comprises means for displaying each object grouped in the selected container object such that no displayed object obstructs the display of another object.

8. The system of claim 1, wherein a same operation is selected to be performed on the selected at least two objects from the first and second container objects selected at the same time.

9. A method for displaying in one window the contents of multiple selected container objects implemented within a computer system having at least a visual operator interface, an operating system for controlling the operation of applications within the computer system, memory for storing at least part of an application, and storage areas storing device objects and data objects accessible to the computer system, the method comprising:

defining, in response to user input from the visual operator interface, a container object by selectively grouping at least one object that is a member of the set of user selectable objects comprising device objects and data objects stored in any storage area accessible to the computer system;

selecting, in response user input from the visual operator interface, container objects; and displaying in a single window the objects grouped by all of the selected container objects, wherein no two of the displayed objects are displayed in separate sub-windows within the single window displaying all of the objects, and wherein at least two objects from the first and second container objects are capable of being selected and operated upon at the same time while displayed in the single window.

10. The method of claim 9, further comprising the step of performing operations on at least one of the objects grouped by the selected container objects.

11. The method of claim 9, further comprising the step of performing operations on all of the objects grouped by the selected container objects.

12. The method of claim 9, further comprising the step of scrolling contents of the single window to display all the objects grouped by the selected container objects.

13. The method of claim 9, further comprising the step of including a device object in more than one container object.

14. The method of claim 9, wherein there are at least three container objects, wherein the step of selecting container objects comprises the step of selecting two of the at least three container objects.

15. The method of claim 9, wherein the step of displaying the objects grouped by the selected container objects further comprises the step of displaying each object grouped in the selected container object such that no displayed object obstructs the display of another object.

16. The method of claim 9, wherein a same operation is selected to be performed on the selected at least two objects from the first and second container objects selected at the same time.

17. An application program for use in programming a computer system to display in one graphical window displayed on a display device contents of multiple selected container objects, wherein the application program is comprised of a computer usable medium that includes at least one computer program that causes the computer system to perform:

defining, in response to input from a visual operator interface, a container object by selectively grouping at least one object that is a member of the set of user selectable objects comprising device objects and data objects stored in any storage area accessible to the computer system;

selecting, in response to input from the visual operator interface, container objects; and displaying in a single window the objects grouped by all of the selected container objects, wherein no two of the displayed objects are displayed in separate sub-windows within the single window displaying all of the objects, and wherein at least two objects from the first and second container objects are capable of being selected and operated upon at the same time while displayed in the single window.

18. The application program of claim 17, further comprising the step of performing operations on at least one of the objects grouped by the selected container objects.

19. The application program of claim 17, further comprising the step of performing operations on all of the objects grouped by the selected container objects.

20. The application program of claim 17, further comprising the step of scrolling contents of the single window to display all the objects grouped by the selected container objects.

21. The application program of claim 17, further comprising the step of including a device object in more than one container object.

22. The application program of claim 17, wherein there are at least three container objects, wherein the step of selecting container objects comprises the step of selecting two of the at least three container objects.

23. The application program of claim 17, wherein the step of displaying the objects grouped by the selected container objects further comprises the step of displaying each object grouped in the selected container object such that no displayed object obstructs the display of another object.

24. The article of manufacture of claim 17, wherein a same operation is selected to be performed on the selected at least two objects from the first and second container objects selected at the same time.

25. A computer system for displaying in one window contents of multiple selected container objects comprising:

a display device;

storage areas storing device objects and data objects accessible to the computer system;

a visual operator interface, comprising:

(i) means for defining, with the visual operator interface means, a first container object including objects associated with a first application program and a second container object including objects associated with a second application program; and (ii) means for selecting the first and second container objects; and means for displaying in a single window displayed on the display device all the objects grouped within the selected first and second container objects, wherein no two of the displayed objects associated with one of the first and second application programs are displayed in separate sub-windows within the single window displaying all of the objects.

26. A method for displaying in one window the contents of multiple selected container objects implemented within a computer system having at least a visual operator interface, an operating system for controlling the operation of applications within the computer system, memory for storing at least part of an application, and storage areas storing device objects and data objects accessible to the computer system, the method comprising:

defining, in response to input from the visual operator interface, a first container object including objects associated with a first application program and a second container object including objects associated with a second application program; and selecting, in response to input from the visual operator interface, the first and second container objects; and displaying in a single window displayed on the display device all the objects grouped within the selected first and second container objects, wherein no two of the displayed objects associated with one of the first and second application programs are displayed in separate sub-windows within the single window displaying all of the objects.

27. An application program for use in programming a computer system to display in one graphical window displayed on a display device contents of multiple selected container objects, wherein the application program is comprised of a computer usable medium that includes at least one computer program that causes the computer system to perform:

defining, in response to input from the visual operator interface, a first container object including objects associated with a first application program and a second container object including objects associated with a second application program; and selecting, in response to input from the visual operator interface, the first and second container objects; and displaying in a single window displayed on the display device all the objects grouped within the selected first and second container objects, wherein no two of the displayed objects associated with one of the first and second application programs are displayed in separate sub-windows within the single window displaying all of the objects.

* * * * *